No. 830,292. PATENTED SEPT. 4, 1906.
J. A. BERNHARD.
HAY GATHERER AND LOADER.
APPLICATION FILED APR. 4, 1906.

2 SHEETS—SHEET 1.

Witnesses.
E. W. Jeppesen.
A. H. Opsahl.

Inventor:
J. A. Bernhard.
By his Attorneys.
Williamson Merchant

THE NORRIS PETERS CO., WASHINGTON, D. C.

No. 830,292. PATENTED SEPT. 4, 1906.
J. A. BERNHARD.
HAY GATHERER AND LOADER.
APPLICATION FILED APR. 4, 1906.

2 SHEETS—SHEET 2.

Witnesses.
E. W. Jeppesen,
A. H. Opsahl.

Inventor:
J. A. Bernhard.
By his Attorneys.
Williamson Merchant.

UNITED STATES PATENT OFFICE.

JOSEPH ALOYSIUS BERNHARD, OF SIDNEY, MONTANA.

HAY GATHERER AND LOADER.

No. 830,292.　　　　Specification of Letters Patent.　　　Patented Sept. 4, 1906.

Application filed April 4, 1906. Serial No. 309,834.

*To all whom it may concern:*

Be it known that I, JOSEPH ALOYSIUS BERNHARD, a citizen of the United States, residing at Sidney, in the county of Dawson and State of Montana, have invented certain new and useful Improvements in Hay Gatherers and Loaders; and I do hereby declare the following to be a full, clear, and exact description of the invention, such as will enable others skilled in the art to which it appertains to make and use the same.

My invention has for its object to provide a hay-loading attachment for wagons; and to the above end it consists of the devices and combinations of devices hereinafter described, and defined in the claims.

In the accompanying drawings, which illustrate the invention, like characters indicate like parts throughout the several views.

Figure 1:
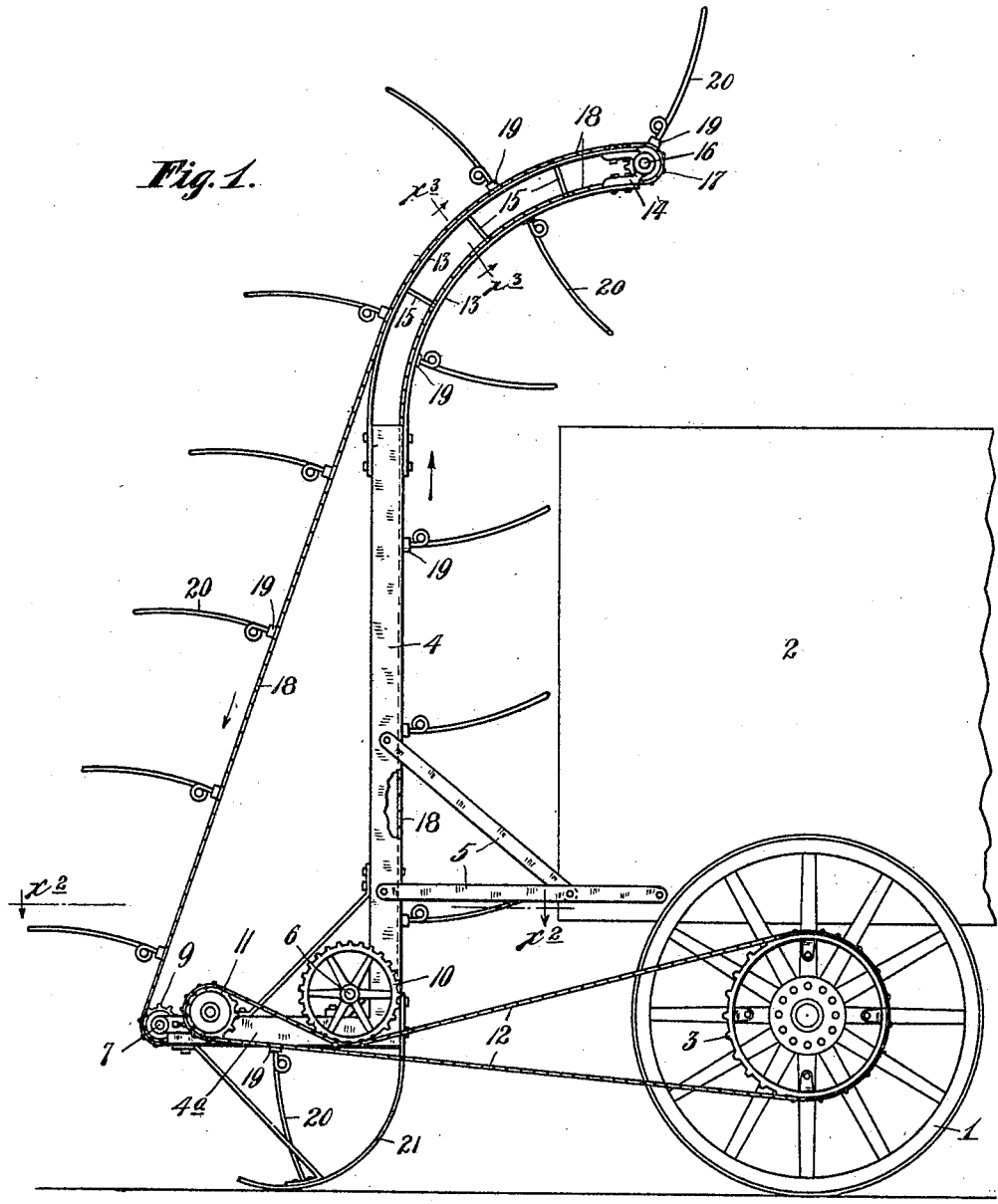
Figure 2:
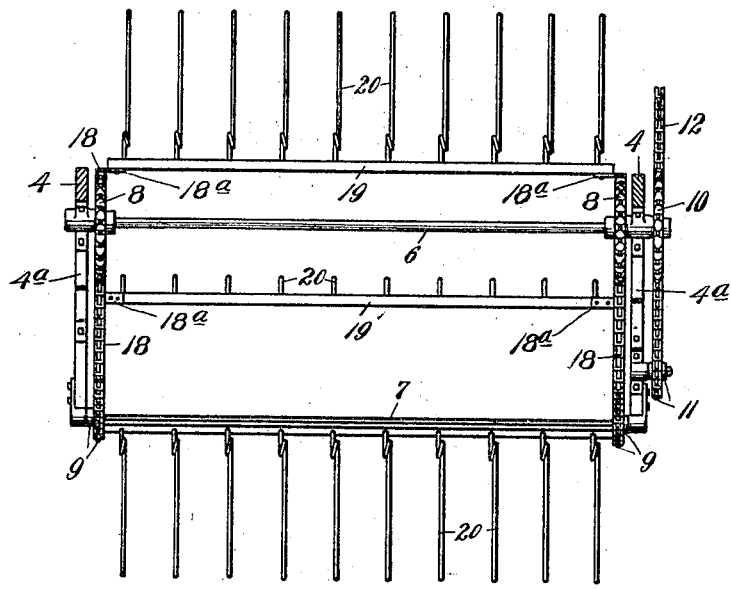
Figure 3:
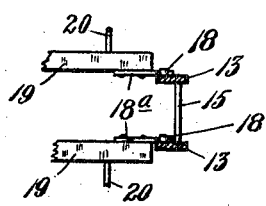

Referring to the drawings, Figure 1 is a view in side elevation showing a portion of the wagon having applied thereto a hay-loading attachment embodying my invention. Fig. 2 is a horizontal section taken on the line $x^2$ $x^2$ of Fig. 1, and Fig. 3 is a transverse section taken on the line $x^3$ $x^3$ of Fig. 1.

The numeral 1 indicates the rear wheels, and the numeral 2 the box or rack, of the wagon. One of these rear wheels carries a large driving-sprocket 3.

Numeral 4 indicates a pair of upright bars, which, as shown, are rigidly connected to the rear lower portion of the wagon-box 1 by means of brackets 5. The lower ends of the upright bars 4 are turned horizontally rearward, as shown at $4^a$, and mounted in suitable bearings thereon are two transversely-extended shafts 6 and 7. The shaft 6 near its ends, but inward of the bars 4 $4^a$, is provided with a laterally-spaced pair of sprockets 8, and the shaft 7 in line with said sprockets 8 is provided with small sprockets 9. At one projecting end the shaft 6 is further provided with a third sprocket 10, that stands in the same plane with the sprocket 3 on the wagon-wheel 1. A sprocket 11 is also mounted in a suitable bearing on one of the bar extensions $4^a$ and stands in the same plane with the sprockets 3 and 10. A sprocket-chain 12 runs over the sprockets 3 and 11 and under the sprocket 10, thereby transmitting motion from one of the rear wheels of the wagon to the shafts 6 and 7 under the forward movement of the wagon.

Curved chain-guides are attached to the upper ends of the uprights 4, and, as shown, these guides are formed each by a pair of parallel curved metal straps 13, the ends of which are tied together by bearing-brackets 14. As shown, the intermediate portions of the parallel straps 13 are tied together by small posts 15. A transverse shaft 16 is mounted in the bearing-brackets 14 and is provided with a pair of sprockets 17, which sprockets are located inward of the tie-posts 15, but in line with the inner portions of the curved guide-straps 13.

A pair of parallel sprocket-chains 18 run over the alined sprockets 8 and 9 and 17 and over the upper surfaces of the curved guide-straps 13. By these sprockets and the guide-straps 13 the chains 18 are caused to move horizontally along the bar extensions $4^a$, then vertically upon the upright straps 4, thence on a curved course upward and over the top of the wagon-box 2 to the sprocket 17, and thence over the upper guide-straps 13 and back again to the sprockets 9. At suitable intervals transversely-extended slats 19 are attached to the chains 18, and to each of these slats is applied a plurality of spring-tines 20. As shown in Fig. 3, certain of the links of the chains 18 are provided with lateral projections $18^a$, to which the ends of the slats 19 are riveted. The attachment is supported in part from the wagon-box by means of the brackets 5; but it is also supported in part by a pair of ground-shoes 21, that are applied to the lower ends of the upright bars 4 and to the extensions $4^a$ thereof.

The operation is as follows: When the wagon is drawn forward, the chains 18 will be driven in the direction of the arrow marked in Fig. 1, and the spring-tines or the teeth 20 as they pass along the ground will pick up any hay coming within their reach and will carry the same vertically upward to the top of the wagon box or rack, and then as the slats 19 move upward and forward along the under guide-straps 13 the hay will be carried over the rear end of the wagon-box, and the tines will be turned downward and caused to dump the hay into the wagon-box. The tines then continue their course and travel rearwardly and downwardly to a point where they are again brought into action to pick up the hay from the ground.

The device described is very simple and of small cost and at the same time is sufficient for the purpose it has in view.

What I claim is—

1. A loading attachment comprising a pair of laterally-spaced uprights 4, a pair of parallel forwardly-curved guide-straps applied to the upper end of each upright, a sprocket-equipped shaft supported on the upper ends of said curved guides, a pair of sprocket-equipped shafts supported on the lower portion of said uprights, a pair of sprocket-chains running over the sprockets of said shafts and over said curved guide-straps, transversely-extended slats secured to said sprocket-chains, and a plurality of tines carried by each slat, substantially as described.

2. The combination with a wagon, one of the wheels thereof having a driving-sprocket 3, of uprights 4 connected to the wagon-box and provided at their lower ends with horizontal extensions 4ª, ground-shoes 21 applied to the lower ends of said uprights, a pair of parallel forwardly-curved guide-straps 13 applied to the upper end of each upright, a shaft 16 equipped with sprockets 17 journaled in bearings at the upper ends of said curved straps, a shaft 6 equipped with sprockets journaled in bearings at the lower ends of said uprights, a shaft 7 equipped with sprockets 9 journaled in bearings at the ends of said extensions 4ª, the sprocket-chains 18 running over the sprockets 8, 9 and 17 and over said curved guide-straps 13, slats 19 applied to said chains, spring-tines 20 applied to said slats, a sprocket 10 on one end of said shaft 6, an idle sprocket 11 on one of the extensions 4ª, and a sprocket-chain running over said sprockets 3 and 11 and under said sprocket 10, substantially as described.

In testimony whereof I affix my signature in presence of two witnesses.

JOSEPH ALOYSIUS BERNHARD.

Witnesses:
    WALTER D. KEMMIS,
    H. E. KEMMIS.